3,283,570
PRODUCTION MEASUREMENT IN MULTIPLE COMPLETION WELLS

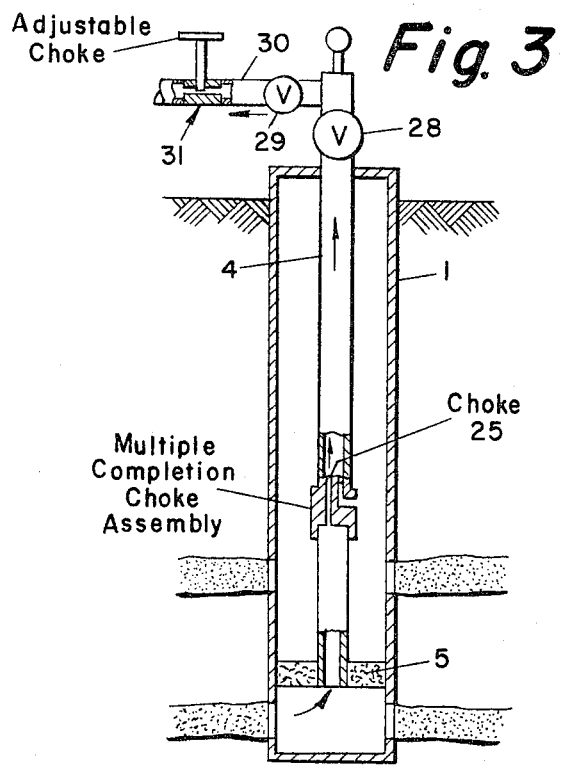
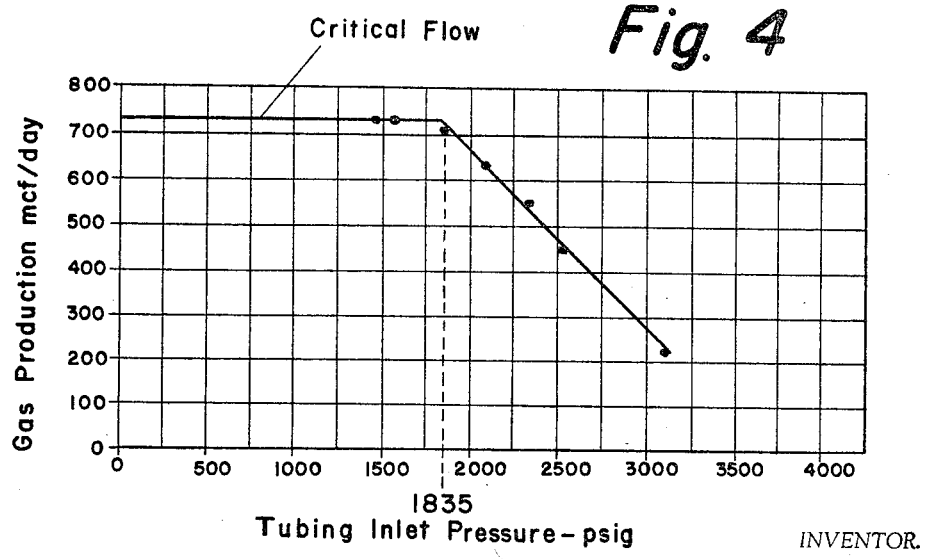

James W. Hodges, Beaumont, Tex., assignor to Sun Oil Company, Philadelphia, Pa., a corporation of New Jersey
Filed June 26, 1963, Ser. No. 290,750
15 Claims. (Cl. 73—155)

This invention relates to the measurement of production in multiple completion wells, and more particularly to methods for determining the production rate from each zone in a well which is producing from two zones or formations through a single tubing string.

This invention is a continuation-in-part of the prior copending but now abandoned application, Serial No. 218,398, filed August 21, 1962, which in turn is a continuation-in-part of abandoned application Serial No. 142,956, filed October 4, 1961.

The Tamplen Patent No. 3,079,996, and also application Serial No. 142,956, disclose wireline tools that make possible the simultaneous production of two separate reservoirs or production zones or formations through a single tubing string. This production is effected by downhole commingling of production from the two zones. A tool of this type may be termed a "multiple completion" tool, or a "dual flow choke" tool.

It is important, from the viewpoint of state regulatory bodies, that the production rates from each of the two separate zones, under commingled flow conditions, be readily and accurately determinable.

An object of this invention is to provide novel methods of using wireline tools of the type previously mentioned.

Another object is to provide methods for determining the respective rates of flow from two separate hydrocarbon-producing formations, under commingled flow conditions. Such rates of flow are determinable from periodic tests and, under certain conditions of flow, may be quite accurately determined on a day-by-day basis, by relatively simple calculations.

A stream is said to be in critical flow when alterations in pressure downstream from an orifice do not affect the rate of flow through the orifice. In any well where two formations are being produced simultaneously through a multiple completion tool of the type referred to previously (wherein the fluid flows from the two formations are passed through separate downhole choke beans and thereafter commingled and led to the surface through a single tubing string), one of the following three conditions will exist: (1) one zone in critical flow; (2) neither zone in critical flow; (3) both zones in critical flow.

Under Condition No. 1 (wherein one of the zones is in critical flow and the other is not), the zone not in critical flow (i.e., the zone out of critical flow, or the non-critical flow zone) can be regulated with a surface control without affecting the flow rate from the other. If the flow rate of the non-critical flow zone is determined by testing this zone separately as a single formation, then (under Condition No. 1) the act of combining the flows from the two formations does not change the production rate (flow rate) as determined from the single formation test data.

Under Condition No. 2 (wherein neither zone is in critical flow, or both zones are in non-critical flow), the production rates from both zones can be easily adjusted at the surface (as by means of an adjustable surface choke), without the necessity of changing the downhole choke beans. If the flow rate of either zone is determined by testing this zone separately as a single formation, then (under Condition No. 2) the act of combining the flows from the two formations does change the flow rate as determined from the single formation test data.

Under Condition No. 3 (wherein both zones are in critical flow), then the flow rate cannot be adjusted at the surface, and such flow rate can be adjusted only by changing the downhole choke beans. If the flow rate of either zone is determined by testing this zone separately as a single formation, then (under Condition No. 3) the act of combining the flows from the two formations does not change the flow rate as determined from the single formation test data.

The methods involved in this invention will now be described in a rather general manner. A multiple completion tool of the type previously referred to is utilized. A first method of production measurement and allocation applies where Condition No. 1 or Condition No. 3 exists (the existence of either of these conditions is determined in a manner which will be subsequently described). The first step is to blank off the lower pressure formation (which would be the non-critical flow zone under Condition No. 1) and measure the rate of flow from the higher pressure formation. Then, after making appropriate modifications in the tool, the combined rate of flow from both formations (when commingled) is measured. Thereafter, by subtracting the result of the first measurement from the result of the second measurement, the rate of flow from the lower pressure formation is obtained; the rate of flow from the higher pressure formation is that obtained from the first measurement.

A second method of production measurement and allocation applies where Condition No. 2 exists (i.e., where both zones are out of critical flow). With the tool set to flow fluid from the higher pressure formation only, measurements of the flow rate and of the downhole pressure at a certain point in the tubing are made, for various values of surface tubing pressure. Then, the interrelated flow rate and downhole pressure measurements are plotted, to define a production-pressure curve. From this, there is calculated the "non-critical flow productivity index" (NCFPI), which is defined as the barrels of liquid produced per day per p.s.i. change in downhole pressure. If the lower pressure zone is capable of producing independently, the foregoing measurement and plotting process is repeated for this zone, and the NCFPI for this latter zone is then calculated in a similar manner. Then, with the tool set to flow fluid from both formations or zones, the downhole pressure at the same certain tubing point is measured; if only one zone is capable of producing independently, this pressure is measured for various rates of flow. In the latter case (wherein only one zone is capable of producing independently), the NCFPI for the lower pressure zone is calculated by a simple process, using the production-pressure curve for the higher pressure zone. Thus, the NCFPI values for both zones are determined. The change in the total production rate from day to day, or the difference in the total production rate from the initial rate when the downhole pressure at the tubing point was measured, will be a function of the NCFPI values; then, the production rate of each zone can be readily determined by calculation, thus allocating the total production to the individual zones.

A detailed description of the invention follows, taken in conjunction with the accompanying drawings, wherein:

FIG. 2 is a diagrammatic representation of fluid flow through an orifice in a pipe;

FIG. 3 is a diagrammatic representation of a test setup, showing equipment at the surface; and FIG. 4 is a typical production-pressure curve.

Figure 1:
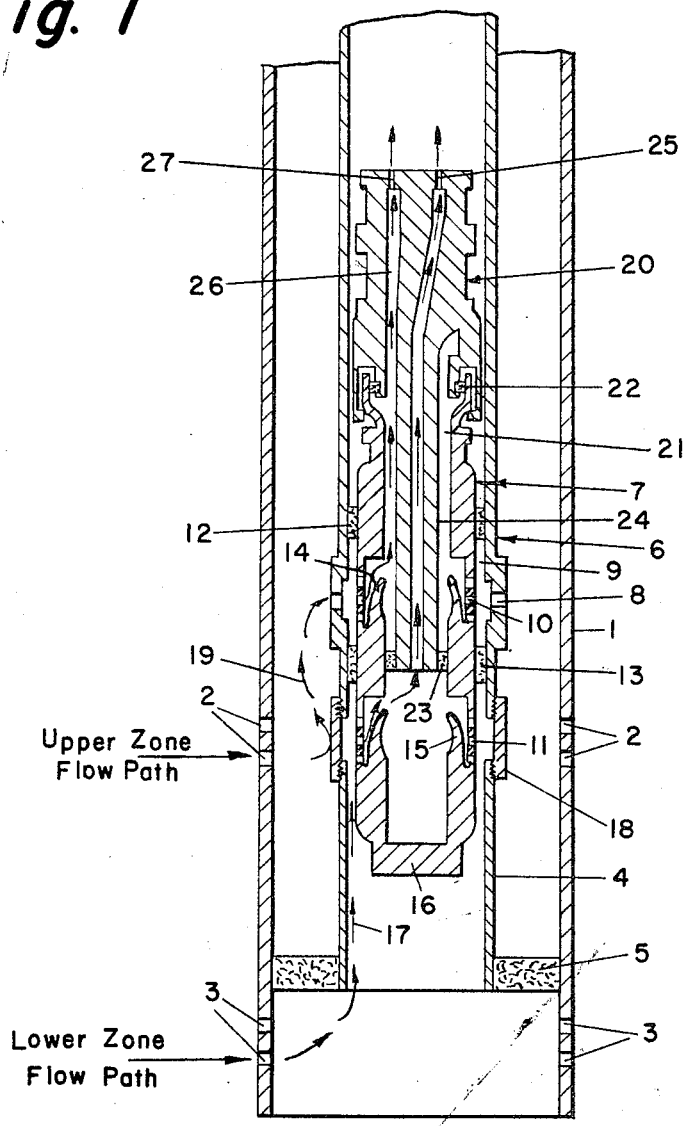
FIG. 1 is a schematic representation of a typical multiple completion tool in position in a well.

Refer first to FIG. 1, which is a somewhat schematic representation of a multiple completion tool (multiple completion choke assembly or dual flow choke tool) used in the procedure of this invention, the tool or assembly being illustrated in position in a well. A well has a casing 1 which has been cemented in place in the usual manner. The well traverses two subsurface hydrocarbon-producing formations (production zones), an upper formation and a lower formation, which may be either gas or oil formations. The casing 1 has been perforated for production from both zones, as illustrated by perforations 2 adjacent the upper zone and perforations 3 adjacent the lower zone. A tubing string 4 is positioned in the casing, and the annulus therebetween is closed off at the bottom of the tubing by means of a production packer 5, which latter prevents communication between the two zones by way of the casing-tubing annulus. The tubing carries a landing nipple assembly 6 (a "side-door choke landing nipple hookup") in which the outer assembly 7 of the tool or flow control device is retrievably locked. The landing nipple assembly 6 is positioned adjacent the upper zone or formation, and contains ports 8 (in the form of a ported collar, located above packer 5, and communicating with the casing-tubing annulus) for receiving fluid from said zone.

An upper packer (not shown), similar to packer 5, may be optionally used above ports 8, to seal the casing-tubing annulus above these ports and to prevent the flow of fluid from the upper zone to the surface by way of this annulus. Suitable packers for these casing-tubing annulus seals or closures are described in my Patent No. 3,022,828, dated February 27, 1962.

The outer assembly or housing 7, which may be located and locked in nipple assembly 6 by means of wireline equipment, forms an annulus 9 with the landing nipple assembly 6. Said outer housing contains upper side ports 10 for passage of fluid from the upper zone, and lower side ports 11 for passage of fluid from the lower zone. Ports 8 and 10 communicate with annulus 9, and ports 11 communicate with the interior of the tubing 4. Upper "pack off" or packing means 12, positioned in annulus 9 above ports 10, and lower "pack-off" or packing means 13, positioned in annulus 9 between ports 10 and 11, prevent fluid flow along the annulus 9 and force the fluid from the upper formation or zone to flow through ports 10 into housing 7; packing means 13 also forces the fluid from the lower formation or zone to flow through ports 11 into housing 7.

The upper side ports 10 define one end of a first internal flow channel which extends upwardly (in outer housing 7) from such side ports. A resilient sleeve-type check valve 14 (illustrated schematically in FIG. 1 as being in the open position, away from ports 10) is positioned in this flow channel, to prevent backflow of fluid toward the upper zone. The lower side ports 11 define one end of a second internal flow channel which extends upwardly (in housing 7) from such side ports. A resilient sleeve-type check valve 15 (illustrated schematically in FIG. 1 as being in the open position, away from ports 11) is positioned in this second flow channel, to prevent backflow of fluid toward the lower zone. Instead of the resilient sleeve-type check valves illustrated, metal and O-ring type check valves could be used.

The lower end of housing 7 has attached thereto an equalizing disc or plug 16, which is normally in a position such as to seal the lower end of this housing. This plug is releasably secured in a skirt (not shown), which is fastened to the lower end of housing 7 by means of a shear pin (not shown). This shear pin may be sheared to allow the plug to move to a lower position wherein fluids may flow into the bottom of housing 7. The lower end of tubing 4, below packer 5, is open, as illustrated in FIG. 1, so that fluid from the lower zone or formation can flow through casing perforations 3 and into the interior of tubing 4, as indicated by the arrows 17, and thence can flow upwardly in the tubing and through housing ports 11 and past check valve 15 into the interior of housing 7. The series of arrows 17 thus indicates the lower zone flow path.

A so-called "blast joint" 18, providing a special abrasion-resistant surface, couples the lower end of nipple assembly 6 to the adjacent section of tubing 4, in a region horizontally aligned with casing perforations 2 and with the upper zone or formation. The landing nipple assembly 6 in effect serves as a special section of tubing inserted in the tubing string, and is coupled at its upper end by means of a flow coupling (not shown) to the adjacent section of tubing 4. Fluid from the upper zone or formation flows through casing perforations 2 and into the casing-tubing annulus, as indicated by the arrows 19, and thence upwardly in this annulus and through tubing ports 8 and housing ports 10 and past check valve 14 into the interior of housing 7. The series of arrows 19 thus indicates the upper zone flow path.

Summarizing the description thus far, with the outer housing 7 run and locked in place in nipple assembly 6, production from each zone or formation can separately enter the housing, but communication between zones is prevented by the resilient check valves 14 and 15.

An inner housing 20, which may be termed an orifice head assembly, is retrievably fastened in position in the outer housing or assembly 7. The inner housing 20 is run separately from outer housing 7, by means of wireline equipment, and seats in the running neck of the outer housing. The inner housing 20 forms an annulus 21 with the outer housing or assembly 7. Upper packing means 22 (e.g., a plurality of O-rings seals), carried by housing 20, seals annulus 21 above housing ports 10, while lower packing means 23 (e.g., a plurality of O-ring seals), carried by a central depending tubular extension or prong 24 of housing 20, seals annulus 21 below ports 10. The inner housing or orifice head assembly 20 has two separate internal fluid flow passages, each of which terminates in a respective choke bean mounted at the upper end of this assembly.

More specifically, one fluid flow passage comprises the bore of tubular extension 24, whose lower end opens into or communicates with the interior of outer housing 7 below the lower packing means 23. The bore of tube 24 extends upwardly through housing 20 and terminates in a choke means (tungsten carbide choke bean) 25 at the upper end of housing 20. The bore of tube 24 thus forms a continuation of the lower zone flow path 17, and the production rate from the lower zone is controlled by choke 25 (through which choke or orifice the fluid flow from the lower formation passes). The upper end of choke bean 25 communicates with the interior of tubing 4.

The other of the two fluid flow passages (in inner housing 20) previously referred to comprises a bore 26 formed in housing 20. The lower end of bore 26 communicates with annulus 21, and this bore extends upwardly through housing 20 (separately from the bore of tube 24), and terminates in a choke means (tungsten carbide choke bean) 27 at the upper end of housing 20. Chokes 25 and 27 are parallel to each other, and they are both located at and mounted in the top of housing 20; although not illustrated in FIG. 1, these chokes are two separate elements which are independently (and separately) readily removable, each from the body of housing 20. It may be seen that fluid from the upper zone flows past check valve 14 into the annulus 21. The bore 26 forms a continuation of the upper zone flow path 19, and the production rate from the upper zone is controlled by choke 27 (through which choke or orifice the fluid flow from the upper formation passes). The upper end of choke 27 communicates with the interior of tubing 4.

It may be seen, from the foregoing, that complete separation of the production from the two formations or zones is maintained prior to the chokes 25 and 27, so that the initial point of commingling of the two streams is just downstream from the choke beans or orifices 25 or 27, i.e., just above these two orifices. The junction of the two streams, that is, the point immediately downstream from the two orifices 25 and 27, will be referred to as the "tubing inlet." Above or downstream from the orifices (choke beans), the two fluid streams commingle, and commingled flow to the surface takes place upwardly through the tubing string 4.

As previously described, the side-door choke landing nipple hookup 6 is located in the tubing string above the lower packer 5. The multiple completion choke assembly or multiple completion tool (which actually consists of two separate assemblies, as previously described) will be locked in this landing nipple 6. The outer assembly 7, which is run independently and locked in the landing nipple 6, contains the check valves 14 and 15 and packing seals 12 and 13 which prevent flow from one zone to the other. In practice, however, only one check valve is usually required, and is installed to protect the zone with the lower pressure.

The orifice head assembly 20, which carries the tungsten carbide choke beans 25 and 27, is run separately and is seated and locked in the outer assembly 7.

The running and locking of the two assemblies comprising the multiple completion or dual flow choke tool are described in detail in the aforementioned Tamplen patent, so the description will not be repeated here.

With the multiple completion or dual flow choke assembly above described, it is relatively easy to make a separate test of one formation or zone, by blanking off production from the other with a blank or plugged choke bean. It order to change chokes to make such tests, or to change production chokes should this become necessary, all that is required is to remove the orifice head assembly 20 from the check-valve assembly (outer housing) 7 and bring the former to the surface, with conventional wireline tools. This is a very simple wireline operation, a routine operation in the hands of an experienced wireline operator. It is pointed out that removal of the orifice head assembly 20 does not result in interzone flow, since the check-valve assembly 7 remains in the well; separation between the zones is then maintained by means of check valves 14 and 15, and packers 12, 13, and 5.

It is pointed out that both of the chokes 25 and 27 are in the same single assembly (to wit, housing 20). It is often desirable to change the chokes controlling each of the two zones, and to do so at the same time. Utilizing the tool construction previously described, this can be accomplished in one operation, upon pulling the housing 20 from the well.

When the multiple completion choke assembly described is being used, the factors that determine production rate for any given fluid from a reservoir are: flowing bottomhole pressure upstream from the choke; choke size; and, under certain conditions, pressure at the "tubing inlet."

The latter pressure will be determined essentially by the gas-liquid ratio, production rate, and tubing size; this latter pressure can be controlled by the operator with a surface choke or regulator, as will be hereinafter described. If the surface tubing pressure is zero, or very nearly so, the "tubing inlet" pressure will be only that pressure required to lift the fluids to the surface. This means that in many instances low-pressure wells can be produced in combination with extremely high-pressure wells, since the tubing inlet pressure represents the only back pressure opposing entry of fluid from the zones into the tubing.

For example, if the combined flow rate from a dual well with a multiple completion choke assembly set in 2⅜" O.D. tubing at 8000 ft. were 200 barrels of oil per day with a gas-liquid ratio of 1000 cubic feet per barrel, the tubing inlet pressure would be approximately 750 p.s.i., as determined from published depth-gradient curves. If the flowing bottomhole pressure of the low-pressure zone exceeded 750 p.s.i., flow could be maintained regardless of the flowing bottomhole pressure of the other zone.

This invention involves the determination of the contribution of each zone to the combined or commingled flow, that is, the determination of the rates of flow from each formation under commingled flow conditions. This enables the total flow to be allocated between the two separate zones, which allocation is required by state regulatory agencies. In fact, such agencies require that production tests (which have as one result the allocation of production to the two zones, when a dual flow choke assembly such as previously described is installed in the well) be made periodically, such as every two months or every three months, during the life of the well. The present invention discloses test procedures and methods which are used initially (and also periodically later, during the life of the well) to allocate production between the two zones, and also, under certain conditions, to allocate the zone production on a day-by-day basis, between the periodic tests. The method of testing for allocation of fluids produced from each zone will depend upon which one of the three previously described conditions (as to critical flow) exists.

FIG. 2 represents a stream of gas flowing through a conduit containing an orifice; this orifice may correspond to one of the chokes 25 or 27 in FIG. 1. In FIG. 2, if the upstream pressure $P_1$ remains constant and the downstream pressure $P_2$ is reduced, the rate of fluid flow through the orifice will increase until $P_2$ reaches approximately 53% of $P_1$. The stream at this point goes into critical flow; any further reduction in $P_2$ has no effect on the flow rate through the orifice. One significance of this phenomenon in the operation of the dual flow choke assembly described (as previously stated) is that, if one of the zones is in critical flow and the other is not (this corresponding to Condition No. 1 set forth hereinabove), the zone not in critical flow (i.e., the non-critical flow zone) can be regulated with a surface choke without affecting the rate from the other.

To explain the foregoing in a slightly different fashion, the critical flow phenomenon governs the effect of tubing inlet pressure on the flow rate through a choke bean in the multiple completion choke assembly (multiple completion tool, or dual flow choke tool) previously described. Critical flow occurs when the ratio of tubing inlet pressure ($P_2$ in FIG. 2) to upstream pressure ($P_1$ in FIG. 2) reaches a certain value. Stated somewhat more precisely, the stream is in critical flow when the $P_2/P_1$ ratio is equal to or less than a certain value, termed the "critical ratio." The critical ratio is approximately 53% (0.53) for gas and is slightly higher for gas-liquid mixtures. If a stream is in critical flow, alterations in tubing inlet pressure will have no effect on the rate of production. For example, if the critical ratio for the stream in question is 55% and the upstream pressure $P_1$ is 2000 p.s.i., the tubing inlet pressure $P_2$ will have no effect on the rate unless this pressure exceeds 1100 p.s.i. If the introduction of fluids from the second zone does not cause the tubing inlet pressure to exceed 1100 p.s.i., addition to the stream will have no effect on production rate from the first zone.

If both zones are out of critical flow (this corresponding to Condition No. 2 set forth hereinabove, wherein both zones are in non-critical flow), the production rates from both zones will vary as the tubing inlet pressure $P_2$ (which is the pressure at a point immediately downstream from the two orifices or choke beans) varies. This tubing inlet pressure can be readily varied by varying the surface tubing pressure or back pressure, as by means of an adjustable choke at the surface. It is pointed out that there could be advantages in having both zones in non-critical flow, since the production rate (from both zones) can then be adjusted at the surface, without the necessity of pulling the orifice head assembly 20 (FIG. 1) in order to change chokes. Another advantage in having both zones in non-critical flow is that higher surface pressures can be maintained (since a higher surface tubing pressure results in a higher tubing inlet pressure $P_2$); higher surface pressures are necessary when a gas well is feeding directly into a high-pressure gas line at the surface. In many wells, this condition (both zones out of critical flow, or in non-critical flow) can be induced, e.g., by increasing the surface tubing pressure.

It is desired to be pointed out that, even though a well may begin production under Condition No. 1 or Condition No. 3 (i.e., only one zone in non-critical flow, or both zones in critical flow), in time it will eventually change to Condition No. 2 (both zones in non-critical flow). If the surface tubing pressure is zero, or very nearly so, the tubing inlet pressure $P_2$ will be only that pressure required to lift the fluids to the surface, and will remain constant, or very nearly so. The upstream pressure $P_1$ represents the reservoir pressure, and will decrease with time, as the well produces. Thus, the ratio $P_2/P_1$ will increase with time, and will eventually reach a value greater than the critical ratio; thus, the streams will eventually go out of critical flow.

In order to allocate production (i.e., to determine the rates of flow from two subsurface formations under commingled flow conditions), initial tests are necessary. The orifice head assembly 20 (FIG. 1) is removed from the checkvalve assembly 7 (leaving the latter in place in the well), and brought to the surface with conventional wireline tools. The zone with the higher pressure is tested individually; assume for illustrative purposes that this is the lower zone. For testing of the lower zone, a blank choke bean is inserted in the opening in the orifice head 20 communicating with the flow path of the upper zone (this would be the opening occupied by choke 27 in FIG. 1). A choke bean, properly sized to produce the desired volume of fluid from the lower zone, is placed in the opposite side of the orifice head (this latter would be the side occupied by choke 25 in FIG. 1). The orifice head 20 is then lowered into the well, and landed and locked in the check-valve assembly 7.

Under these conditions, the upper zone cannot flow because of the blank choke bean. Produced fluids from the lower zone are measured into conventional surface facilities until a stabilized 24-hour test is obtained.

It must be determined whether the lower zone is in critical flow during the aforementioned test, and also during a later test of the combined production. Speaking broadly, it is determined if a stream is in critical flow by changing the surface tubing pressure with an adjustable choke, measuring the rate of flow into conventional test facilities, and observing the effect of the back pressure changes on the tubing inlet pressure. A setup such as illustrated in FIG. 3 may be used. In FIG. 3, the upper or surface end of the production tubing string 4 is connected by means of a pair of valves 28 and 29 to a more or less horizontally-extending flow line 30 in which there is located an adjustable choke 31. By turning the handle associated with adjustable choke 31, the effective size of this choke may be varied, thereby varying the back pressure or tubing pressure at the surface. Also, for the test determination with respect to critical flow, using the setup of FIG. 3, the tubing inlet pressure (i.e., the pressure immediately downstream from the orifice head assembly) is measured with a bottomhole pressure gauge (not shown). FIG. 3 shows a blank choke bean in the upper zone flow path, and choke bean 25 in the lower zone flow path.

Using the setup in FIG. 3, the surface tubing pressure or back pressure is varied (by means of adjustable choke 31), and the corresponding rates of flow (from the lower zone) and tubing inlet pressure are measured. Results obtained by means of measurements on an actual well are presented in Table I following. These results may be considered typical. The production figures are given for the lower zone of the well, with the upper zone closed in by means of a blank choke bean in the orifice head.

*Table I*

| Surface Tubing Pressure, p.s.i. | Tubing Inlet Pressure, p.s.i. | Gas Rate, Mc.f.d. | Liquid Rate, b.p.d. |
| --- | --- | --- | --- |
| 790   | 1,466 | 727 | 38 |
| 950   | 1,549 | 727 | 39 |
| 1,060 | 1,835 | 707 | 37 |
| 1,250 | 2,091 | 639 | 32 |
| 1,335 | 2,345 | 555 | 30 |
| 1,475 | 2,517 | 454 | 23 |
| 1,600 | 3,125 | 222 | 12 |

Instead of measuring the tubing inlet pressure with a pressure gauge, this pressure may be determined by calculation, using published depth-pressure gradient curves.

The interrelated rate of flow measurements (either the gas rates of the third column of Table I, or the liquid rates of the fourth column of Table I, for example) and the downhole pressure measurements (such as those in the second column of Table I) are plotted to define a production-pressure curve. FIG. 4 is such a plot, using the "gas rates" and "tubing inlet" pressures of Table I. The "liquid rates" of Table I could just as well be used, instead of the "gas rates." It may be seen that the production-pressure curve of FIG. 4 has a point of inflection at approximately 1835 p.s.i. This means that the lower zone being tested is in critical flow at a tubing inlet pressure of approximately 1835 p.s.i. or below. This value of 1835 p.s.i. is about 55% of the upstream pressure of approximately 3300 p.s.i.

After the above-described individual tests of the higher pressure zone (e.g., the lower zone) have been completed, the orifice head assembly 20 is again removed from the well. The blank bean is replaced with a production bean (bean 27), and the assembly 20 is returned to its operating position in the well. Now, the combined rate of flow from both formations, under commingled flow conditions, is measured, on the basis of a stabilized 24-hour test. Also, the tubing inlet pressure is measured, under these commingled flow conditions, or else it is calculated.

If this latter pressure is less than the critical pressure (which was found to be 1835 p.s.i. in the above example), it is known that the lower zone is in critical flow when combined. Thus, the previously-determined rate of flow from the lower zone is not affected by combining with the upper zone, and this previously-determined rate (from the lower zone) is subtracted from the combined rate of flow, the difference being assigned or allocated to the upper (lower pressure) zone.

The results actually obtained on the "combined" test of the same well previously referred to (in connection with Table I) will now be given, to make the foregoing explanation clearer. On "combined" or "commingled" test, the tubing inlet pressure at 7550 ft., measured with a bottomhole pressure gauge, was 1720 p.s.i., with a surface tubing pressure of 1100 p.s.i. As a check, the published depth-pressure gradient curves were used to determine the tubing inlet pressure under these conditions of flow; this value was interpolated to be 1650 p.s.i. In either case, the tubing inlet pressure showed that the lower zone was in critical flow when combined or commingled with the upper zone. Thus, the previously-determined rate from the lower zone was not affected by combining with the upper zone.

The total liquid measured (under commingled flow conditions) in 24 hours was 123 barrels. The lower zone is known to have produced 37 barrels (by reference to Table I, at or about the critical tubing inlet pressure of 1835 p.s.i.). Therefore, by subtraction, the upper zone produced 86 barrels. The gas-liquid ratio of the upper zone was calculated to be 784 cubic feet per barrel.

Two months later on a single-zone test, the lower zone produced 33 barrels; when combined, production was 120 barrels. Thus, the upper zone was producing 87 barrels per day. The gas-liquid ratio was essentially unchanged.

Now assume, when testing the same well, that the tubing inlet pressure exceeded 1835 p.s.i. when the two zones were commingled, which means that the lower zone (which is the higher pressure zone) was in non-critical flow (i.e., it was out of critical flow). Since this higher pressure zone was out of critical flow, it will be appreciated that the lower pressure zone (with its lower $P_1$) was also out of critical flow; thus, both zones were out of critical flow, or in non-critical flow. Under this condition (which is Condition No. 2 hereinabove) the act of combining or commingling the production from the two zones has changed the rate of flow as determined from the single zone test data. As has previously been pointed out, there could be advantages in having both zones out of critical flow, and often such a condition can be induced to realize one or more of these advantages.

One procedure which could be used for zone allocation, when both zones are out of critical flow, will now be described. The production-pressure curve (such as the one in FIG. 4, obtained in the manner previously described, which curve determines the rate to be expected from the higher pressure formation during periods of combined flow) is used for the determination of lower zone (higher pressure formation) production. The difference between this last mentioned production and the combined production is contributed by the upper zone, and is allocated thereto. Continuing with the previous example, assume that the tubing inlet pressure on combined-zone test was 2517 p.s.i. By reference to Table I (or to the FIG. 4 curve), the gas production from the lower zone would be 454 M c.f. per day and the liquid production from this zone (see Table I) would be 23 barrels per day. Then, the difference between this liquid volume and the total combined liquid volume (determined by measurement to be 123 barrels per day, as stated previously) would be contributed by the upper (lower pressure) zone; in this case, the liquid contribution of the upper zone would be 123 minus 23 or 100 barrels per day.

It may be noted that, using the method described in the preceding paragraph, the tubing inlet pressure (which is the pressure at a downhole location) must be known, in order to allocate production accurately. It is often desirable, particularly where there is a diversity of royalty ownership between the two zones (as is sometimes the case), to be able to allocate production at very frequent intervals, for example on a day-by-day basis. This would require, when using the method of the preceding paragraph, the measurement of the tubing inlet pressure (down the well) at these same very frequent intervals; this is quite impractical.

There will now be described a practical method which enables a reasonably accurate allocation of production, even on a day-by-day basis. This method, once the initial tests are completed, does not depend on knowledge of the day-to-day changes in tubing inlet pressure. According to the method to be described, the change in production rate, resulting from a change in tubing inlet pressure, is allocated on the basis of indices (factors) determined from the individual zone tests.

The practical procedure or method of measurement and allocation, for a situation wherein both zones are in non-critical flow, is somewhat different for the two possible cases, in one of which (Case A) only one zone is capable of flowing independently, and in the other of which (Case B) both zones are capable of flowing independently. There will first be described the method for Case A, wherein only one zone is capable of flowing (producing) independently.

The first step is to test this zone (which can flow independently), flowing, against a range of tubing inlet pressures expected to occur when the two zones are commingled. In other words, the conditions expected during combined flow are simulated, in order that a flow rate can be established for this zone. This is done with the setup of FIG. 3, as previously described, using a bottomhole pressure gauge for the tubing inlet pressure measurement. Then, a curve like FIG. 4 is drawn, plotting production rate versus tubing inlet pressure.

The next step is to calculate (from the production-pressure curve just plotted) the NCFPI for this zone, which is defined as the barrels of liquid produced per day per p.s.i. change in tubing inlet pressure.

The next step is to produce both zones simultaneously and measure the tubing inlet pressures at various rates of flow, the flow rate being varied with a surface choke and the pressure again being measured with a downhole instrument. From the production-pressure curve plotted in the first step, the flow rate from the first zone, for each of these latter tubing inlet pressures, can be determined. The difference in production, for each of these latter pressures, is assigned to the second zone; the NCFPI for the second zone can then be calculated.

For each day after the initial test, until the next test, the change in the total production rate will be ascribed to change in tubing inlet pressure. The day-to-day change in the production rate, or the difference in the production rate from the initial rate when the tubing inlet pressure was measured, will be a function of the two NCFPI values.

An example will now be givven, to clarify the procedure set out above. Table II, following, gives assumed test data for a Zone X, which is the zone capable of flowing independently.

*Table II*

| BOPD: | Tubing inlet pressure, p.s.i. |
|---|---|
| 100 | 2500 |
| 120 | 2400 |
| 140 | 2300 |

A production-pressure curve is plotted, using the data of Table II.

The NCFPI for

Zone X = $(120-100) \div (2500-2400) = 0.2$ barrel/day/p.s.i. change in tubing inlet pressure.

Table III, following, gives assumed test data for the combined production.

*Table III*

| BOPD: | Tubing inlet pressure, p.s.i. |
|---|---|
| 130 | 2600 |
| 160 | 2500 |
| 190 | 2400 |

From the first curve plotted, it is determined that Zone X is producing 100 BOPD against a tubing inlet pressure of 2500 p.s.i. Therefore, Zone Y (the other zone) must be producing $(160-100)=60$ BOPD at this pressure. In similar manner, it is calculated that Zone Y is producing 70 BOPD at 2400 p.s.i. Then, the NCFPI for Zone Y is $10 \div 100 = 0.1$.

At an initial combined rate of 160 BOPD, Zone X is producing 100 BOPD (from the first curve) and Zone Y is producing 60 BOPD (by subtraction). Now, assume that on the following day the combined rate is 150 BOPD. The method for allocation for this changed rate is then as follows:

Zone X = $100 - (160-150)\left(\dfrac{\text{Zone X NCFPI}}{\text{Zone X Index} + \text{Zone Y Index}}\right)$ $= 100 - 10\left(\dfrac{.2}{.2+.1}\right) = 93.3$ BOPD Zone $Y = 60 - 10\left(\frac{.1}{.2 + .1}\right) = 60 - 3.3 = 56.7$ BOPD (or $150 - 93.3 = 56.7$ BOPD)

There will next be described the method for Case B (wherein both zones are in non-critical flow, and both are capable of flowing independently). The first step is to test each zone separately, against a range of tubing inlet pressures expected to occur when the two zones are commingled. The setup of FIG. 3 can be used for doing this. Flow rates and the corresponding tubing inlet pressures are recorded. Then, two separate curves like FIG. 4 are drawn, each one being the plot of production rate versus tubing inlet pressure for a respective one of the zones.

After the curves have been drawn, the NCFPI values for the two zones are calculated separately, each from its respective production-pressure curve.

The next step is to produce both zones simultaneously and measure the tubing inlet pressure, and also the flow rate.

Following this, the indicated flow rate for each zone is ascertained, each from its respective production-pressure curve, at the combined or commingled tubing inlet pressure. The sum of the indicated flow rates for the two zones is then compared with the measured combined rate. In general, due to unavoidable errors in gauging, etc., this measured combined rate will be different from the summed indicated rate.

The difference between the summed indicated rate and the measured combined rate is allocated between the two zones in proportion to the indicated rates. For example, if the indicated rates (each figured at the same tubing inlet pressure as the measured combined tubing inlet pressure) are 100 BOPD for Zone X and 120 BOPD for Zone Y, but the measured (actual) combined rate is 230 BOPD, then the allocated rate for Zone X is $$109 + \left(\frac{100}{100 + 120}\right)(230 - 220) = 104.5$$

and the allocated rate for Zone Y is $$120 + \left(\frac{120}{100 + 120}\right)(230 - 220) = 120 + 5.5 = 125.5$$

(or $230 - 104.5 = 125.5$)

Just as in Case A, if the measured combined rate changes from one day to another, allocation between the two zones will be based on the NCFPI values. For example, if the combined rate changes from the initial value of 230 BOPD to 200 BOPD, the allocation procedure is as follows:

Zone X = 104.5

$$- (230 - 200)\left(\frac{\text{Zone X NCFPI}}{\text{Zone X Index} + \text{Zone Y Index}}\right)$$

and

Zone Y = 200 — allocated production for Zone X

If the NCFPI values happened to be the same as in Case A above, the results would be 84.5 BOPD allocated to Zone X, and 115.5 BOPD allocated to Zone Y.

The invention claimed is:

1. In a method of determining the rates of flow from two subsurface hydrocarbon-producing formations, the steps of:
    (a) flowing fluid from only one formation through an orifice and thence through a conduit to the surface,
    (b) varying the surface pressure in said conduit and measuring the corresponding rate of flow in said conduit and also the corresponding downhole pressure at a point within said conduit immediately downstream from said orifice,
    (c) plotting the interrelated rate of flow and downhole pressure measurements to define a production-pressure curve having a point of inflection,
    (d) flowing fluid from both formations through separate orifices and thence commingled through a common conduit to the surface,
    (e) measuring the combined rate of flow from both formations when so commingled, and
    (f) measuring the downhole pressure under commingled flow conditions at a point within said conduit immediately downstream from the orifices; whereby after a comparison of the last-mentioned pressure with the value of pressure at the point of inflection of said curve, the respective rates of flow from the two formations, under commingled flow conditions, may be determined.

2. Method as set forth in claim 1, wherein said one formation is the higher pressure formation.

3. Method as set forth in claim 1, wherein the respective rates of flow from the two formations are determined by means of a simple arithmetical calculation involving the measured combined rate of flow from both formations.

4. In a method of determining the rates of flow from two subsurface hydrocarbon-producing formations, the steps of:
    (a) flowing fluid from only one formation through an orifice and thence through a conduit to the surface,
    (b) varying the surface pressure in said conduit and measuring the corresponding rate of flow in said conduit and also the corresponding downhole pressure at a point within said conduit immediately downstream from said orifice,
    (c) plotting the interrelated rate of flow and downhole pressure measurements to define a production-pressure curve having a point of inflection at a critical pressure,
    (d) flowing fluid from both formations through separate orifices and thence commingled through a common conduit to the surface,
    (e) measuring the combined rate of flow from both formations when so commingled,
    (f) measuring the downhole pressure under commingled flow conditions at a point within said conduit immediately downstream from the orifices, and
    (g) referring the last-mentioned pressure to said curve and determining the rate of flow from said one formation, under commingled flow conditions, by employing one or the other of the two following alternative procedures:
        (1) when said last-mentioned pressure is not greater than said critical pressure, utilizing as the rate of flow from said one formation the flow rate corresponding to said critical pressure;
        (2) when said last-mentioned pressure is greater than said critical pressure, utilizing as the rate of flow from said one formation the flow rate, obtained from said curve, corresponding to said last-mentioned pressure.

5. Method as set forth in claim 4, wherein said one formation is the higher pressure formation.

6. Method as set forth in claim 4, wherein the rate of flow from the other of said two formations is determined by means of a simple arithmetical calculation involving the determined rate of flow from said one formation.

7. Method as set forth in claim 4, wherein the rate of flow from the other of said two formations is determined by means of a simple arithmetical calculation involving the measured combined rate of flow from both formations.

8. Method as set forth in claim 4, wherein the rate of flow from the other of said two formations is determined by calculating the difference between the measured combined rate of flow from both formations and the determined rate of flow from said one formation.

9. In a method of determining the initial rates of flow from two subsurface hydrocarbon-producing formations and the day-by-day changes in such flow rates, the steps of:
(a) flowing fluid from only one formation through an orifice and thence through a conduit to the surface,
(b) varying the surface pressure in said conduit and measuring the corresponding rate of flow in said conduit and also the corresponding downhole pressure at a point within said conduit immediately downstream from said orifice,
(c) plotting the interrelated rate of flow and downhole pressure measurements to define a production-pressure curve,
(d) determining from said curve the non-critical flow productivity index (NCFPI) of said formation as the fluid flow rate per unit change in downhole pressure,
(e) determining from other flow rate—downhole pressure measurements the NCFPI of the other formation, and
(f) allocating day-by-day changes in the measured combined flow rate from both formations to the two formations on the basis of the respective NCFPI values.

10. Method as set forth in claim 9, wherein said one formation is the higher pressure formation.

11. Method as set forth in claim 9, wherein the NCFPI of said other formation is determined from measurements of various rates of combined flow and the corresponding downhole pressures.

12. Method as defined in claim 11, wherein the flow rates of said other formation are determined by subtracting the flow rates of said one formation from the corresponding combined flow rates, each at the same downhole pressure.

13. Method as set forth in claim 9, wherein the NCFPI of said other formation is determined from measurements of various rates of flow from the other formation and the corresponding downhole pressures.

14. In a method of determining the initial rates of flow from two subsurface hydrocarbon-producing formations and the day-by-day changes in such flow rates, the steps of:
(a) flowing fluid from only one formation through a first orifice and thence through a conduit to the surface,
(b) varying the surface pressure in said conduit and measuring the corresponding rate of flow in said conduit and also the corresponding downhole pressure at a point within said conduit immediately downstream from said orifice,
(c) plotting the interrelated rate of flow and downhole pressure measurements to define a first production-pressure curve,
(d) flowing fluid from only the other formation through a second orifice and thence through a conduit to the surface,
(e) varying the surface pressure in said conduit and measuring the corresponding rate of flow in said conduit and also the corresponding downhole pressure at a point within said conduit immediately downstream from said second orifice,
(f) plotting the interrelated last-mentioned rate of flow and downhole pressure measurements to define a second production-pressure curve,
(g) flowing fluid from both formations through separate orifices and thence commingled through a common conduit to the surface,
(h) measuring the combined rate of flow from both formations when so commingled,
(i) measuring the downhole pressure under commingled flow conditions at a point within said conduit immediately downstream from the orifices,
(j) determining the indicated flow rate from each formation from its respective one of said first and second curves, at the last-mentioned pressure, and
(k) allocating the difference between the measured combined flow rate and the sum of the two indicated flow rates in proportion to the indicated flow rates for the respective formations.

15. In a method of determining the initial rates of flow from two subsurface hydrocarbon-producing formations and the day-by-day changes in such flow rates, the steps of:
(a) flowing fluid from only one formation through a first orifice and thence through a conduit to the surface,
(b) varying the surface pressure in said conduit and measuring the corresponding rate of flow in said conduit and also the corresponding downhole pressure at a point within said conduit immediately downstream from said orifice,
(c) plotting the interrelated rate of flow and downhole pressure measurements to define a first production-pressure curve,
(d) determining from said curve the non-critical flow productivity index (NCFPI) of said one formation as the fluid flow rate per unit change in downhole pressure,
(e) flowing fluid from only the other formation through a second orifice and thence through a conduit to the surface,
(f) varying the surface pressure in said conduit and measuring the corresponding rate of flow in said conduit and also the corresponding downhole pressure at a point within said conduit immediately downstream from said second orifice,
(g) plotting the interrelated last-mentioned rate of flow and downhole pressure measurements to define a second production-pressure curve,
(h) determining from said second curve the NCFPI of said other formation, and
(i) allocating day-by-day changes in the measured combined flow from both formations to the two formations on the basis of the respective NCFPI values.

References Cited by the Examiner
UNITED STATES PATENTS 1,406,682   2/1922   Rathbone _____ 73—155

RICHARD C. QUEISSER, *Primary Examiner.*

J. W. MYRACLE, *Assistant Examiner.*